United States Patent [19]
Haarhuis et al.

[11] Patent Number: 4,935,840
[45] Date of Patent: Jun. 19, 1990

[54] COMPRESSED GAS-INSULATED BUS CONNECTION BETWEEN A METAL-ENCLOSED, COMPRESSED GAS-INSULATED HIGH VOLTAGE SWITCHING INSTALLATION AND A TRANSFORMER

[75] Inventors: Juergen Haarhuis; Dieter Lorenz, both of Berlin, Fed. Rep. of Germany

[73] Assignee: Siemens Aktiengesellschaft, Berlin & Munich, Fed. Rep. of Germany

[21] Appl. No.: 353,255

[22] Filed: May 16, 1989

[30] Foreign Application Priority Data

May 17, 1988 [DE] Fed. Rep. of Germany ....... 3817217

[51] Int. Cl.⁵ .............................................. H02B 1/00
[52] U.S. Cl. .................................. 361/333; 361/335; 361/341
[58] Field of Search ................. 361/333, 335, 341, 332

[56] References Cited

U.S. PATENT DOCUMENTS

| | | | |
|---|---|---|---|
| 1,879,000 | 9/1932 | Ainsworth | 361/341 |
| 3,619,726 | 11/1971 | Boersma | 316/341 |
| 4,072,999 | 2/1978 | Volman et al. | 361/333 |
| 4,493,009 | 1/1985 | Lorenz et al. | 361/341 |

FOREIGN PATENT DOCUMENTS 0055094 1/1985 European Pat. Off. .

*Primary Examiner*—Roy N. Envall, Jr.
*Attorney, Agent, or Firm*—Kenyon & Kenyon

[57] ABSTRACT

A compressed gas-insulated bus between a metal-enclosed, compressed gas-insulated high-voltage switching installation and a transformer. The compressed gas-insulated bus, with or without a compensator, serves to connect a transformer to a metal-enclosed, compressed gas-insulated high-voltage switching installation. Since the transformer must sometimes be replaced, the gas-insulated bus should provide an as large as possible, compensable tolerance zone for the position of the transformer connection. For this purpose, the transformer connection to the gas-insulated bus with a compensator is connected by means of a first rotary flange to one end of a Z- or U-shaped enclosed compressed gas-insulated bus connection member, the other end of the connection member being connected to the gas-insulated bus proper by means of a second rotary flange. The compensable tolerance zone is determined by twisting this gas-insulated bus connection member and by the allowable angular movement of the compensator, whereby the allowable axial movement of the compensator can be disregarded. In a gas-insulated bus without a compensator, the transformer connection and the gas-insulated bus are each connected via respective rotary flanges to respective Z-shaped gas-insulated bus connection members with each connection member being connected to the other via further rotary flanges. Such a gas-insulated bus is disposed between a transformer and a compressed gas-insulated high-voltage switching installation of an electric supply plant.

4 Claims, 4 Drawing Sheets

COMPRESSED GAS-INSULATED BUS CONNECTION BETWEEN A METAL-ENCLOSED, COMPRESSED GAS-INSULATED HIGH VOLTAGE SWITCHING INSTALLATION AND A TRANSFORMER

BACKGROUND OF THE INVENTION

The present invention relates to a compressed gas-insulated bus between a metal-enclosed, compressed gas-insulated high-voltage switching installation and a transformer, which contains in one embodiment a compensator and in which the bus is connected on one side to a bus connection of the metal-enclosed, compressed gas-insulated high-voltage switching installation and on the other side to a transformer connection.

Such compressed gas-insulated buses are common and are known, for example, from EP No. 0 055 094 B1. In these buses, a conductor is disposed inside a typically cylindrical housing. Between the housing and the conductor a compressed insulating gas is provided. The compensator present in the known gas-insulated bus allows a certain range of tolerance for fastening the gas-insulated bus to the adjacent connecting sleeves. This possible range of tolerance depends on the allowable movements, predetermined by the dimension of the compensator, in the direction of its longitudinal axis $\pm \Delta L$ and the allowable angular movements $\pm \alpha$. The range of tolerance ascertainable by the angular movements is thereby also dependent on the distance L between the compensator and the flange connection used for the gas-insulated bus connection. Thus, the possible tolerance compensation depends primarily on the dimensions of the compensator which is an expensive structural member and has a tendency of buckling easily during large axially allowable movements on account of the large number of required folds or windings, so that only the allowable axial excursion of the compensator can be utilized for the tolerance compensation.

But even in compressed gas-insulated buses without a compensator it is sometimes necessary to provide a compensable range of tolerance for the connecting sleeve of the transformer connection.

To increase operational availability it is a requirement, however, in the event of damage precisely with transformers in electric supply plants and connected to metal-enclosed, compressed gas-insulated high-voltage switching installations, that a transformer be replaced as quickly as possible, for which reason the range of tolerance to be covered with the gas-insulated buses (with or without a compensator) can be very large since the dimensions of the connecting sleeves of the transformer connections can vary.

SUMMARY OF THE INVENTION

It is, therefore, an object of the present invention to provide a compressed gas-insulated bus with or without a compensator between a transformer and a metal-enclosed, compressed gas-insulated high-voltage switching installation such that a large compensation tolerance zone for the fastening to the flange connection of the transformer connection is provided with the least possible expense.

The above and other objects of the invention are achieved in one embodiment by a compressed gas-insulated bus between a metal-enclosed, compressed gas-insulated high-voltage switching installation and a transformer, which contains a compensator and in which the gas-insulated bus is connected on one side to a connection of the metal-enclosed, compressed gas-insulated high-voltage switching installation and on the other side to a transformer connection, wherein the transformer connection is connected by means of a first rotary flange to one end of a Z-shaped or U-shaped enclosed compressed gas-insulated bus connection member, another end of the connection member being connected to a portion of the gas-insulated bus by means of a second rotary flange.

Due to the Z-shaped or U-shaped compressed gas-insulated bus connection member connected via two rotary flanges between the gas-insulated bus and the transformer connection, the distance between the flange connection of the transformer connection and the gas-insulated bus provided with a lateral flange connection can be compensated in the axial direction, i.e. in the direction of the longitudinal axis of the bus, by twisting about the center line of the second rotary flange. The mid-portion of the enclosed Z- or U-shaped gas-insulated bus connection member is then inclined accordingly. The possible compensable range of tolerance is thereby no longer restricted by the allowable movement of the compensator in the axial direction. Rather, the possible range of tolerance is given by the distance between the mid-points of the two rotary flanges and by the allowable angular excursion of the compensator and has an elliposoidal shape. Consequently, the allowable axial movement of the compensator can be disregarded.

Despite a desire for an as large a range of tolerance as possible for fastening to the connecting sleeve of the transformer connection, the compensator can be kept small by this provision, which reduces the expense of the bus but nevertheless allows replacement of the transformers with differently located connection sleeves.

If a connecting face of the transformer's flange connection runs parallel to the end face of the gas-insulated bus, then a correspondingly compensable ellipsoidal range of tolerance is obtained when connecting the second rotary flange to the end face of the gas-insulated bus. This range of tolerance lies in a plane extending parallel to the end face of the gas-insulated bus.

A further plane, at a right angle thereto, of the compensable range of tolerance results with connection of a Z- or U-shaped enclosed gas-insulated bus connection member to the end face of the transformer connection via the first rotary flange if the end face of the transformer connection lies below the gas-insulated bus and if the gas-insulated bus has a lateral flange connection.

Advisably the compensator in the gas-insulated bus is arranged adjacent the connection of the metal-enclosed, compressed gas-insulated high-voltage switching installation so that the allowable angular excursion can be utilized for an as large a compensable range of tolerance as possible.

To solve the problem in a gas-insulated bus of the kind named at the beginning without a compensator in accordance with a further aspect of the invention, the transformer connection and the gas-insulated bus are respectively connected via respective rotary flanges to one end of respective Z-shaped, enclosed gas-insulated bus connection members, the two other ends of the Z-shaped gas-insulated bus connection members being connected with one another by a further rotary flange.

The compensable range of tolerance is thereby increased to a circular area and the expense resulting from a compensator is dropped. In accordance with the position of the respective connecting face of the transformer connection—lateral, end face or below the gas-insulated bus—the compensable ranges of tolerance likewise lie in three planes that are at right angles to one another.

It is recommended that the two Z-shaped enclosed gas-insulated bus connection members be identical. This results in a closed circular area as the compensable range of tolerance.

BRIEF DESCRIPTION OF THE DRAWINGS

The invention will be described in greater detail in the following detailed description with reference to the drawings, in which.

DETAILED DESCRIPTION

Figure 1:
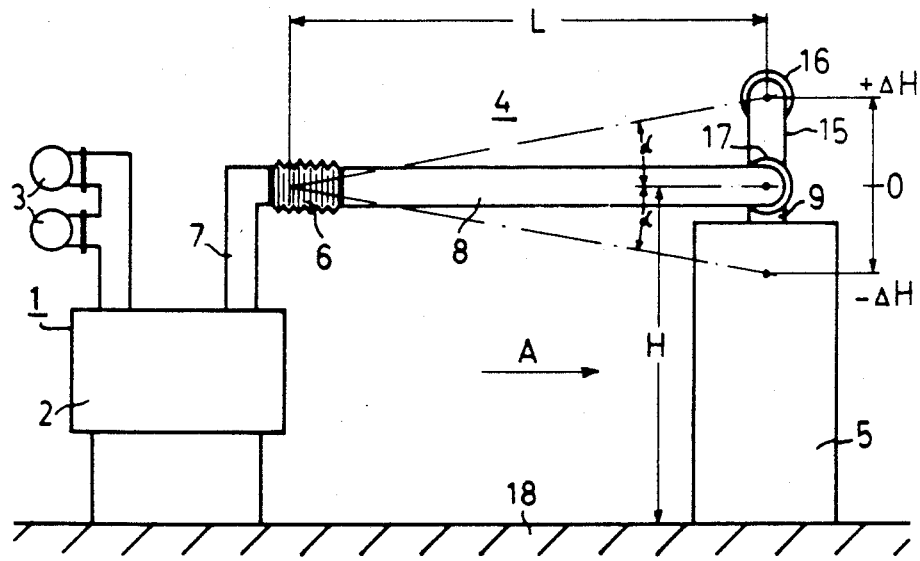
FIGS. 1 and 6 show the basic structure of a compressed gas-insulated bus designed in accordance with two embodiments of the invention connected between a metal-enclosed compressed gas-insulated high-voltage switching installation and a transformer.

FIG. 1 shows a metal-enclosed, compressed gas-insulated high-voltage switching installation 1 comprising a pressure vessel 2 with a circuit breaker and a double bus bar system 3. This high-voltage switching installation is connected to a transformer 5 via a compressed gas-insulated bus connection 4 which contains a compensator 6 arranged adjacent a connection 7 of the metal-enclosed, compressed gas-insulated high-voltage switching installation 1 and which is fastened to the connection 7.

Figure 3:
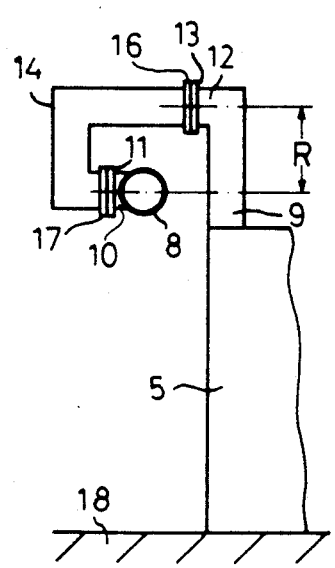
FIGS. 2, 3 and 7 each show a modified embodiment of a view A of the transformer with a connected compressed gas-insulated bus.
Figure 2:
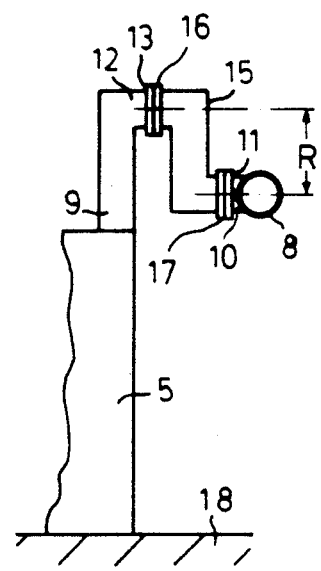

The gas-insulated bus 8 of the gas-insulated bus connection 4 extends between the compensator 6 and the transformer connection 9 and ends in a flange connection 10 aligned at right angles to its longitudinal axis, the connecting face 11 of the flange connection lying in a plane extending parallel to the plane of the longitudinal axis of the gas-insulated bus 8. Similarly, the transformer connection 9 has a lateral flange connection 12, extending at right angles to its longitudinal axis, the connecting face 13 of the flange connection likewise lying in a plane which extends parallel to the plane of the longitudinal axis of the transformer connection 9. A difference in height R, indicated in FIG. 2 and 3 by arrows, exists between the center lines of the flange connection 10 on the gas-insulated bus 8 and the flange connection 12 on the transformer connection 9.

For the connection between the gas-insulated bus 8 and the transformer connection 9, a U-shaped enclosed gas-insulated bus connection member 14 (FIG. 3) or a Z-shaped enclosed gas-insulated bus connection member 15 (FIG. 2), which spans the distance R between the center lines of the flange connection 10 on the gas-insulated bus 8 and the flange connection 12 on the transformer connection 9, is used depending on the position of the transformer 5 vis-a-vis the gas-insulated bus 8. These Z-shaped (15) or U-shaped (14) enclosed gas-insulated bus connection members are connected at one end to the flange connection 12 of the transformer connection 9 via a first rotary flange 16. The other end of the enclosed gas-insulated bus connection member 14, 15 is respectively joined to the flange connection 10 of the gas-insulated bus 8 via a second rotary flange 17. The distance of the center lines of the two rotary flanges 16, 17 thus corresponds to R.

These rotary flanges 16, 17 are common structural members in compressed gas-insulated, metal-enclosed high-voltage switching installations and allow the parts connected via them to be mutually twisted. This means that with a fixed height H of the longitudinal axis of the gas-insulated bus 8 above the foundation 18, indicated by the arrow in FIG. 1, the Z-shaped or U-shaped enclosed gas-insulated bus connection member 14, 15 can be rotated about the flange connection 10 so that the flange connection 12 of the transformer connection 9 lies on the circle with the radius R, which thus represents an essential defining quantity for the compensable tolerance zone $T_1$ or $T_2$ (see FIGS. 4 and 5).

However, the compensable tolerance zone $T_1$ or $T_2$ is not only dependent on the radius R, but is also restricted by the possible angular movement $+\alpha$ of the compensator 6. This compensator allows a permissible angle $\alpha$ determined by its dimensions (illustrated by arrows in FIG. 1) in order to be able to carry out the angular movements of the compensator 6 above or below the longitudinal axis of the bus section 8. This means that with a length L of the bus 4, determined by the compensator 6 and the bus section 8, the longitudinal axis of the flange connection 10 of the bus section 8 can be moved vertically upwards or downwards as a result of the permissible angle $\alpha$ for swivelling the compensator 6, which vertical movement may at the most be the amount $+\Delta H$ or $-\Delta H$ (see FIG. 1). Thereby $H = L \cdot \tan\alpha$.

Figure 4:
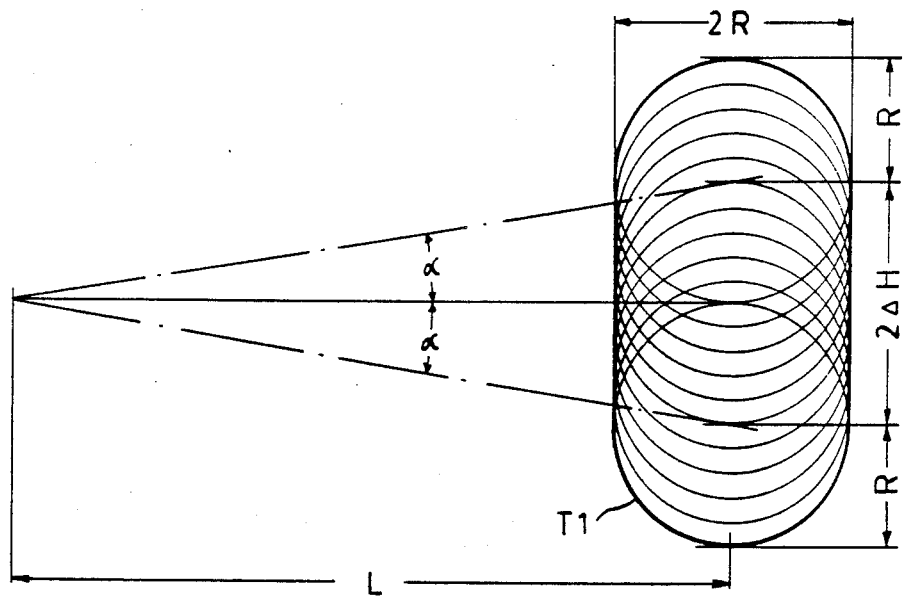
FIGS. 4, 5 and 8, 9 schematically illustrate the possible compensable range of tolerance of an arrangement according to FIG. 1 or FIG. 6 as a function of the dimensions of compressed gas-insulated buses.
Figure 5:
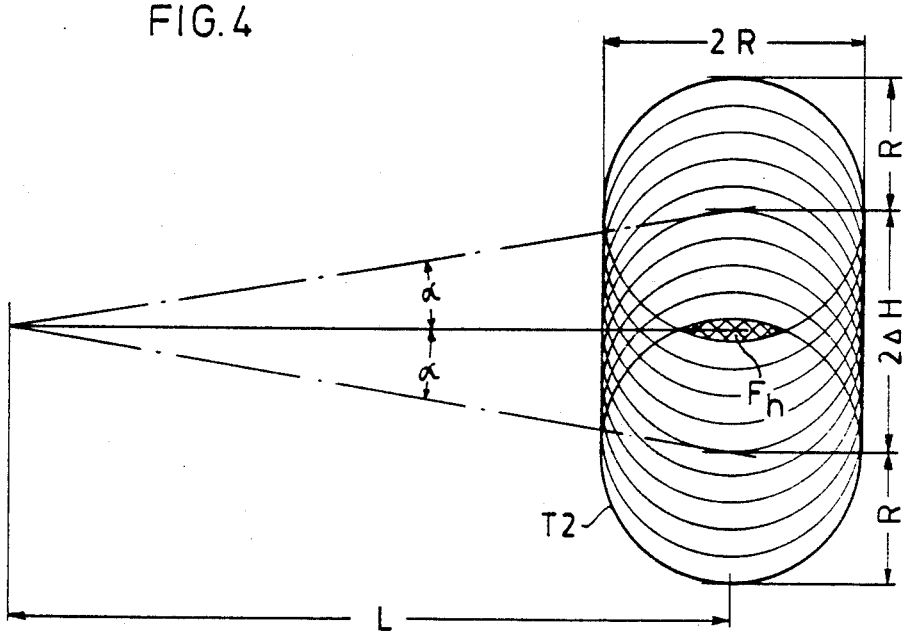

From this dependence of the allowable compensable tolerance zone $T_1$, $T_2$ on the values L, H, R and the angle$\alpha$, an allowable compensable tolerance zone.

$$T_1 = (2\Delta H \cdot 2\ R) + \pi R^2,$$

illustrated in FIG. 4, results with an allowable angle of $\alpha \leq 5°$ and a difference in height of $R \leq \Delta H = L \cdot \tan\alpha$, i.e. which is less than or equal to the allowable variation in height $\Delta H$. This tolerance zone $T_1$ thus depends on the values $2\Delta H$ and the radius R and is completely self-contained so that all points lying within this tolerance zone $T_1$, which would correspond to the position of the flange connection 12 at the transformer connection 9, could be included by the gas-insulated bus connection 4.

The ratios vary if the radius is $R > \Delta H = L \cdot \tan\alpha$. With an allowable angle of $\alpha \pm 5°$, a tolerance zone $T_2$, illustrated in FIG. 5, results in this case. This tolerance zone $T_2$ is equal to $T_2 = (2\Delta H \cdot 2\ R) + \pi R^2 - F_h$.

The partial area $F_h$ is not part of the compensable tolerance zone $T_2$, so that the connecting face 13 on the flange connection 12 of the transformer connection 9 may not lie within the area $F_h$.

Figure 6:
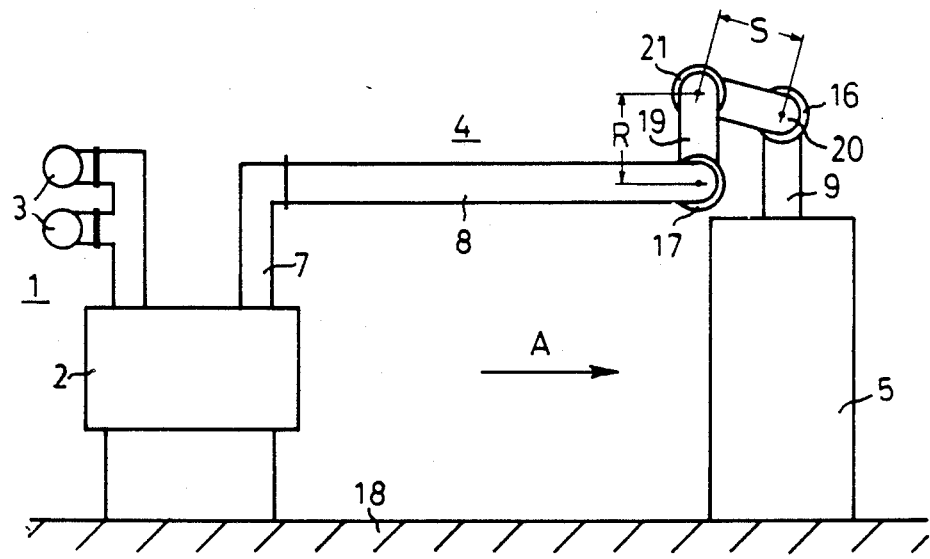
Figure 7:
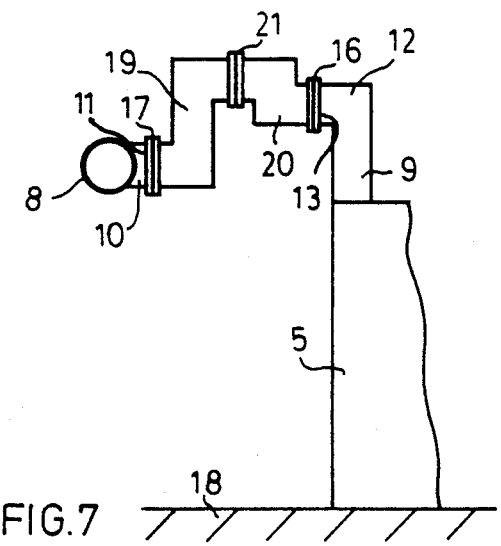

A further modified embodiment of the invention is illustrated in FIGS. 6 and 7. The same reference numerals have been retained for the same parts.

Figure 8:
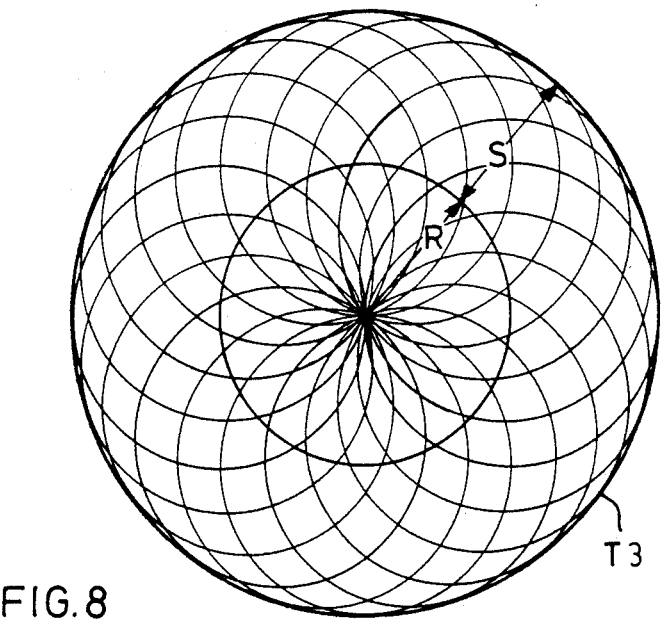

There is no compensator in the gas-insulated bus connection 4 between the metal-enclosed, compressed gas-insulated high-voltage switching installation 1 and the transformer 5 so that the gas-insulated bus section 8 is connected directly to the connection 7 of the metal-enclosed, compressed gas-insulated high-voltage switching installation. Two Z-shaped, enclosed gas-insulated bus connection members 19, 20 are used for the connection between the gas-insulated bus section 8 and the transformer connection 9, these connection members being respectively connected to the flange connection 12 of the transformer connection or to the flange connection 10 of the gas-insulated bus section 8 via a rotary flange 16, 17 and being connected with one another via a further rotary flange 21. The leg length R of the Z-shaped enclosed bus connection member 19 corresponds to the distance between the center lines of the rotary flanges 17 and 21 and the leg length S of the Z-shaped gas-insulated bus connection member 20 corresponds to the distance between the center lines of the rotary flanges 16 and 21. The distances R and S are indicated in FIG. 6 by arrows. By mutually twisting the rotary flanges 16, 17, 21, the two Z-shaped enclosed gas-insulated bus connection members 19, 10 are inclined to one another so that the connecting sleeve 12 of the transformer connection 9 can lie within a circle with the radius $R+S$. This increased compensable tolerance zone $T_3$ or $T_4$ (see FIGS. 8 and 9) results from the fact that the center lines of the rotary flange 21 can likewise shift.

The allowable compensable tolerance zone $T_3$, $T_4$ thus depends solely on the values R and S. In the event that $R=S$, the tolerance zone $T_3$ illustrated in FIG. 8 results, this zone forming a closed circular area with the radius $R+S=2\,R=2\,S$.

Figure 9:
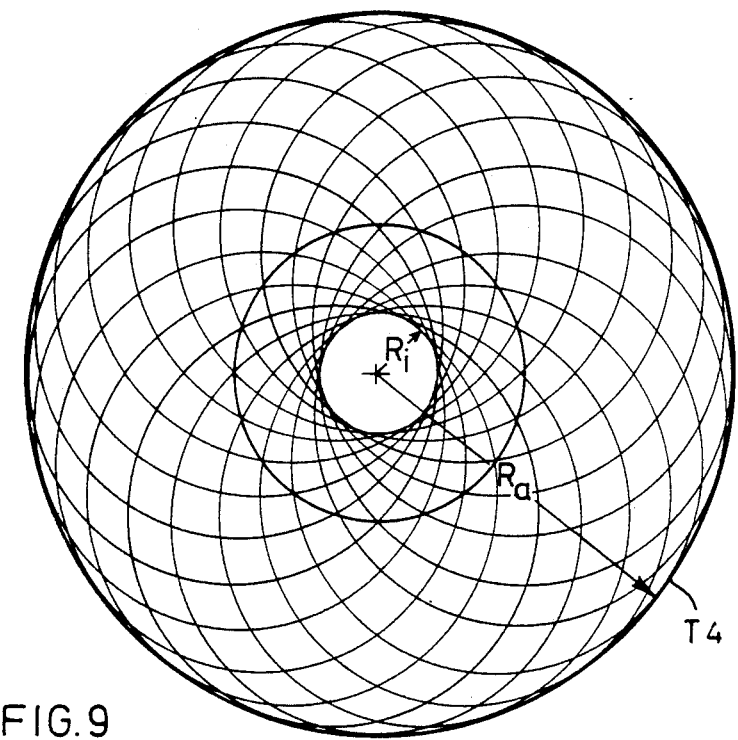

In the event that R and S have different values ($R<S$, $R>S$), the compensable tolerance zone $T_4$, illustrated in FIG. 9, results in the shape of a ring. The outer radius $R_a$ of this tolerance zone $T_4$ has the value $R+S$. The inner radius $R_i$ corresponds to the absolute sum of the difference in the values of the two radii R and S. In this case the rotary flange 16 at the transformer connection 9 may only lie within the circular area of the tolerance zone $T_4$.

In the foregoing specification, the invention has been described with reference to specific exemplary embodiments thereof. It will, however, be evident that various modifications and changes may be made thereunto without departing from the broader spirit and scope of the invention as set forth in the appended claims. The specification and drawings are, accordingly, to be regarded in an illustrative rather than in a restrictive sense.

What is claimed is:

1. A compressed gas-insulated bus between a metal-enclosed, compressed gas-insulated high-voltage switching installation and a transformer, the gas-insulated bus including a compensator, the bus being connected on one side to a connection of the metal-enclosed, compressed gas-insulated high-voltage switching installation and on another side to a transformer connection, the transformer connection being connected by a first rotary flange to one end of a Z-shaped or U-shaped enclosed gas-insulated bus connection member, another end of the connection member being connected to a portion of the gas-insulated bus by a second rotary flange.

2. The gas-insulated bus recited in claim 1, wherein the compensator in the gas-insulated bus is arranged adjacent the connection of the gas-insulated bus to the metal-enclosed, compressed gas-insulated high-voltage switching installation.

3. A compressed gas-insulated bus between a metal-enclosed, compressed gas-insulated high-voltage switching installation and a transformer, the gas-insulated bus being connected on one side to a connection of the metal-enclosed, compressed gas-insulated switching installation and on another side to a transformer connection, the transformer connection and the gas-insulated bus each being connected via respective rotary flanges to ends of respective Z-shaped enclosed gas-insulated bus connection members, and the two other ends of the respective Z-shaped gas-insulated bus connection members being connected to one another by respective further rotary flanges.

4. The gas-insulated bus recited in claim 3, wherein the two Z-shaped enclosed bus connection members are identical.

* * * * *